March 2, 1926.
J. V. THOMPSON
1,575,465
MORTISE AND TENON JOINT LOCK
Filed May 2, 1925
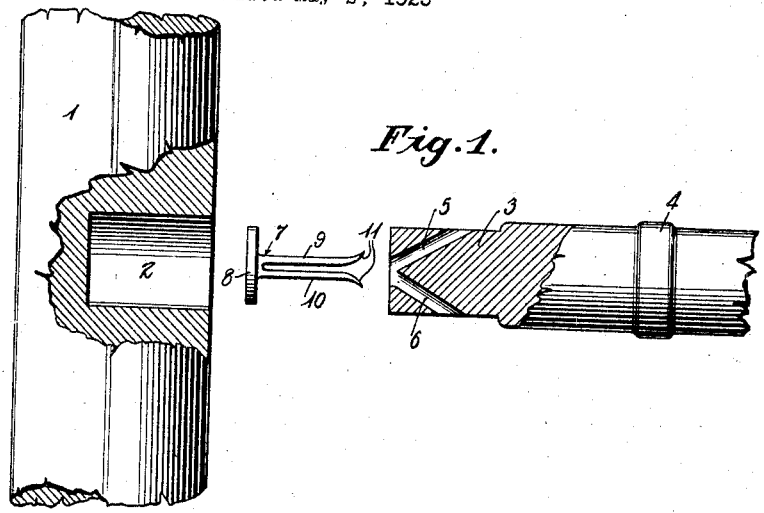
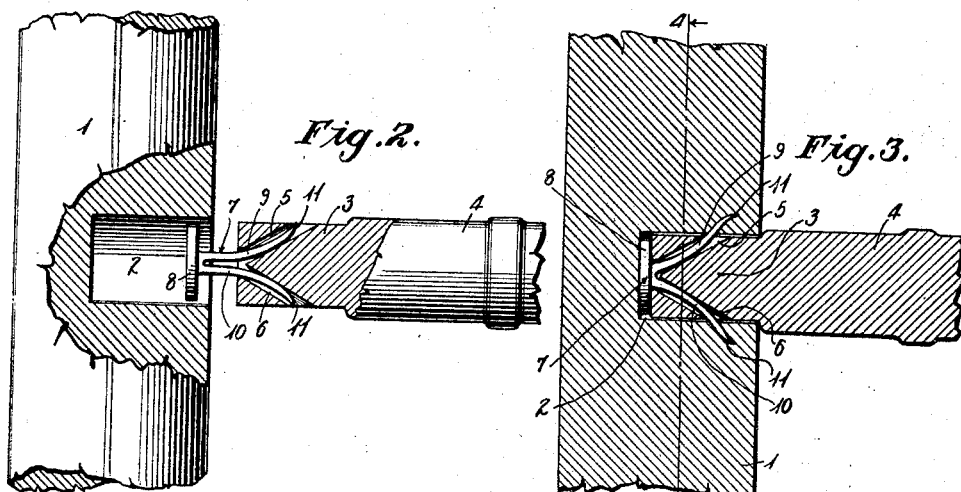
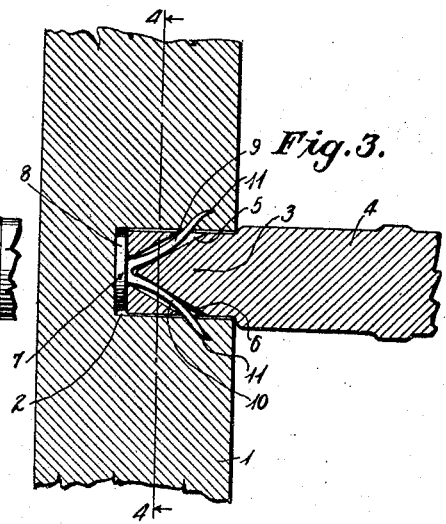
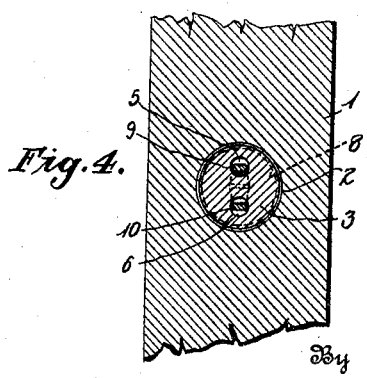
Inventor
John V. Thompson
By James P. Burns
Attorney Patented Mar. 2, 1926.

1,575,465

UNITED STATES PATENT OFFICE.

JOHN V. THOMPSON, OF HIGH POINT, NORTH CAROLINA.

MORTISE AND TENON JOINT LOCK.

Application filed May 2, 1925. Serial No. 27,436.

*To all whom it may concern:*

Be it known that I, JOHN V. THOMPSON, a citizen of the United States, now residing in the city of High Point, county of Guilford, and State of North Carolina, have invented certain new and useful Improvements in Mortise and Tenon Joint Locks, of which the following is a specification.

My present invention relates to an improved means for firmly and securely fastening the two members of a mortise and tenon joint together. My invention contemplates the use of a single unitary element which can be positioned in the tenon prior to its insertion into the mortise socket.

One object of my invention is to provide an improved mortise and tenon joint lock which will be easy of application and economical to manufacture and which will securely hold the elements of the joint in assembled relation. I am well aware that many forms of locking elements have been constructed and that the prior art discloses many examples of mechanisms adapted to perform the function of locking the separate members of a mortise and tenon joint together. In my experience I have found that substantially all of the known devices consist of a plurality of elements which can only be assembled by the exercise of extreme care and skill. The use of such fastening devices greatly increases the expense in manufacturing articles in which such joints are employed, particularly furniture, such as chairs, tables, and the like. It is the specific object of my invention to overcome the difficulties present in the employment of the known mortise and tenon joint locks by providing a single locking member that can be readily applied by inexperienced labor and which does not materially add to the cost of manufacture of the articles in which my improved joint is employed.

While I have illustrated my invention in the accompanying drawings as associated with a joint such as employed in uniting a chair rung and leg, it will be understood that my improved locking means may be utilized in any mortise and tenon joint where a secure fastening of the elements is desired.

In the drawings,—

Figure 1 is a side elevation showing the manner of assembling the various elements of my invention.

Fig. 2 is a side elevation similar to Fig. 1 showing the manner in which the tenon is inserted into the mortise socket, Fig. 3 is a view, partly in section, showing the completed joint with my improved locking means incorporated therein.

Fig. 4 is a sectional view along the line 4—4 of Fig. 3.

For the purpose of simplicity in describing my invention, it may be assumed that the member 1 is an ordinary chair leg provided with the mortise socket 2 adapted to receive the tenon end 3 of the chair rung 4.

The tenon end 3 of the chair rung 4 is provided with a pair of diverging recesses 5 and 6 extending from substantially the center of the end of the chair rung to points intermediate the length of the tenon. The locking member comprises a split metal nail indicated generally at 7. I have successfully used nails made of wrought iron. Nails of other material may, however, be employed. This nail has an enlarged flat head member 8, the function of which will be later described, and two leg portions 9 and 10 each provided with an outwardly curved sharpened point 11.

Describing the method of applying my improved mortise and tenon locking means, the legs 9 and 10 of the nail 7 are inserted through the recesses 5 and 6 respectively in the tenon 3. These legs are extended through the recesses only to such an extent as will bring the sharpened curved ends 11 of the legs into alinement with the outer wall of the tenon. This permits the insertion of the tenon into the mortise socket without any marring of the edges of the socket by the locking means and the arrangement is such that the locking means does not strike the wood of the mortise socket in the chair leg until the points 11 are well within the mortise socket. The rung 4 is driven or forced into the mortise socket until the enlarged head 8 of the nail 7 strikes the bottom of the socket. At this point the sharpened ends 11, which it will be noted are initially curved in a direction opposite to the force exerted thereagainst by the walls of the socket in the chair leg, are now driven home into the wood of the chair leg 1 by the continued application of force to the rung 4 and leg 1. The enlarged head 8 gives a firm footing against the bottom of the socket and very effectively forces the sharpened ends 11 of the legs 9 and 10 into the side walls of the socket 2. The curvature of the end portions 11 of the legs 9 and 10 is particularly important because it is this curvature that causes the ends of the legs 9 and 10 to assume the fish-hook grabbing position more accurately disclosed in Fig. 3. It will be noted that the wood of the chair leg is usually hard and the continued application of force to the leg 1 and rung 4 after the head 8 of the nail 7 has been brought into contact with the bottom of the socket 2 causes the ends 11 to penetrate the wood in the sides of the socket and the stress upon the ends of the legs 9 and 10 then causes the curved ends 11 to assume the position shown in Fig. 3.

I preferably provide the nail 7 with the enlarged head 8 to give an even application of force to the legs 9 and 10 so that each leg will be driven into the socket wall. Furthermore, the enlarged head 8 covers substantially the entire bottom area of the mortise socket so that there is no tendency for the head to form a fulcrum about which the tenon might rock if the socket is slightly oversize.

It will thus be seen that in my improved invention the further the rung 4 is driven into the leg 1 the more secure becomes the interlocking engagement between the rung and leg. The hooked ends 11 of the legs 9 and 10 are so positioned when the joint is completed that any stress applied toward the pulling of the members apart only causes them to be more securely interlocked.

I am able to overcome the difficulties existing in the prior art devices where a plurality of elements are usually employed by using only a single interlocking member which, as above described, can be applied to the end of the rung 4 by inserting the legs 9 and 10 of the split nail 7 through the recesses 5 and 6 and then driving the rung to its proper position in the socket 2 of the chair leg 1.

Having thus fully described my invention, what I claim as new and desire to secure by Letters Patent is:

1. Means for locking the members of a mortise and tenon joint in assembled relation, comprising a tenon having a plurality of recesses diverging outwardly from the end thereof, a single metallic member having a leg portion extending through each of said diverging recesses, and a head portion overlying the end of the tenon, said leg portions adapted to be driven into the wall of the mortise socket when the tenon is inserted therein to securely interlock the tenon member in the mortise socket.

2. Means for securing the members of a mortise and tenon joint together, comprising a split nail having an enlarged head, said enlarged head adapted to be seated upon the bottom of the mortise socket, the separate sections of the split nail being adapted to extend divergently through the end of the tenon member and to engage the wall of the socket member.

3. Locking means for a mortise and tenon joint, comprising a member having diverging sections, each of said sections adapted to pass through a recess in the tenon member, the end of each of said sections being curved to counteract the stress imposed thereon when the tenon member is inserted into the mortise socket and to penetrate the wall of the mortise socket at a reverse angle to said curvature by the application of force to either the tenon or socket member.

JOHN V. THOMPSON.